May 3, 1938.    P. W. NESBIT    2,115,740
WORK OR TEST SHEET
Filed Feb. 20, 1934

Inventor
Paul W. Nesbit
By Clarence A. O'Brien
Attorney

Patented May 3, 1938

2,115,740

UNITED STATES PATENT OFFICE 2,115,740

WORK OR TEST SHEET

Paul William Nesbit, Walsenburg, Colo.

Application February 20, 1934, Serial No. 712,182

2 Claims. (Cl. 35—22)

My invention relates generally to means for teaching and testing the knowledge of information, and particularly to a work or test sheet, and an important object of my invention is to provide novel departures in devices, to the end that more accurate and serviceable tests can be made, and considerable educative value added to the use of devices of this kind.

Other objects and advantages of my invention will be apparent from a reading of the following description in connection with the drawing wherein for purposes of illustration I have shown a preferred embodiment of my invention.

In the drawing:—

Figures 1, 2:
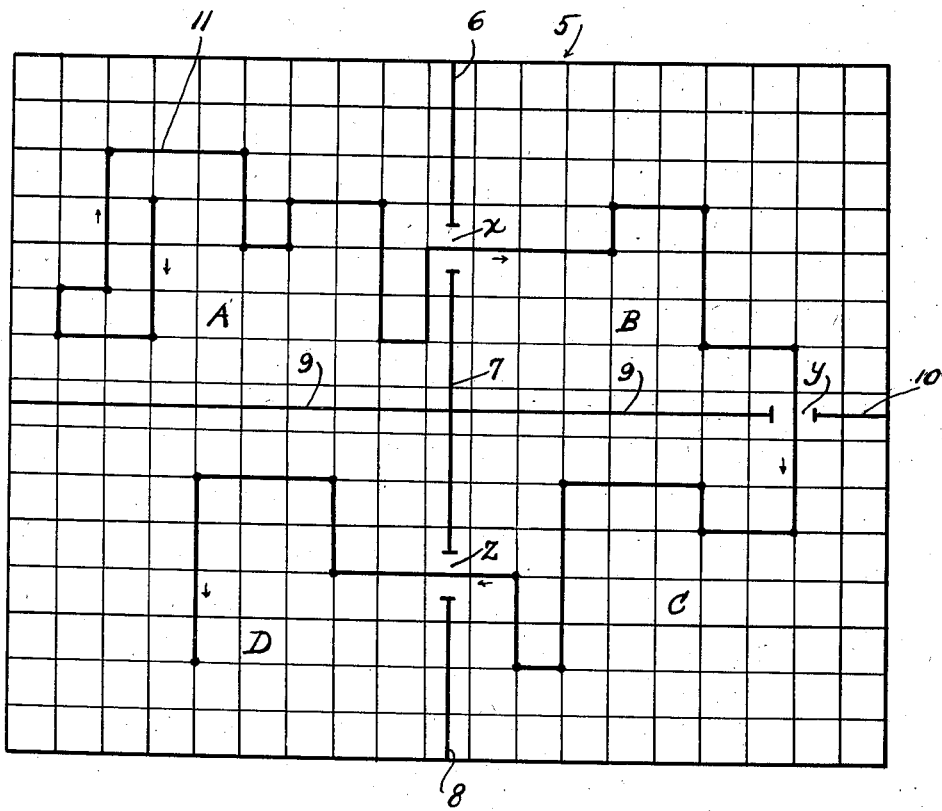
Figure 1 is a plan view of a work or test sheet in accordance with the invention showing thereon lines drawn in correct solution of a test.
Figure 2 is an edge view of Figure 1.

Referring in detail to the drawing, the numeral 5 refers generally to a work or test sheet of suitable material such as paper or cardboard or the like which is provided with a predetermined number of squares by ruling the same. Any desired number of squares counting down or across may be provided if desired. In the embodiment shown the sheet is 19 squares long and 15 squares wide, thereby providing an odd number of squares. A centrally located transverse line 6 is spaced from and aligned with a line 7, and the line 7 is alignedly spaced from another transverse line 8. The spacings of these lines provide the "gates" or "doors" $x$ and $z$, respectively.

A centralized longitudinal line 9 is spaced from a short aligned longitudinal line 10 to define the "gate" or "door" $y$. The intersection of the lines 7 and 9 divide the graph into four "compartments", A, B, C, and D. The numeral 11 designates the line or lines which are made with a pencil or a pen by the pupil in solving or attempting the solution of the problems which are presented in statement or question form.

The device affords testing in which the person taking the test must correct his own errors. The taker of the test must route his idea over an irregular path on a piece of cross ruled paper. If his ideas are correct, he passes the hazards safely, but if he makes a wrong move because of some misunderstanding, then he must find in what respect the wrong move was incorrect and correct it, before he can proceed.

The cross-ruled paper may be of any size, shape, or number of squares. It is divided into any number of "compartments" of any desired size, with "gates" or "doorways" so that one may proceed from one "compartment" to another in any order previously decided upon. A certain place in the first "compartment" is chosen as the starting point. The drawing shows the cross-ruled paper divided into four "compartments" A, B, C, and D, with the starting point in A labeled and with the doorways $x$, $y$, and $z$.

A test which I use in illustration of the invention consists of twenty-nine statements, somewhat in the nature of definitions, and a word to fit each statement included in a list containing some extra words. Each word of the list has with it the direction for some move on the cross-ruled paper. U stands for "up" or toward the top of the paper, D stands for "down" or toward the bottom, R stands for "right", and L stands for a move to the "left". The figure with the letter indicates how many squares the move is to take in. Thus D3 means move down three squares.

Biology test

Select the word in the third column which appears to fit the definition opposite to it in the first column and write in the corresponding blank space the number of the definition.

Key ↓

1. A group of tissues with a definite function.
2. The element that supports combustion.
3. The name for sugars and starches.
4. The force attracting objects to the earth.
5. A substance which cannot be further simplified chemically.
6. The nutrient that contains nitrogen.
7. Combination with oxygen.
8. Capable of going into solution.
9. The element that forms four fifths of the air.
10. A name for all living things.
11. A state of matter with neither definite shape nor size.
12. Not a part of living things nor made by them.
13. The element which forms water when it burns.
14. The smallest particle of an element.
15. The product of the burning of carbon.
16. The state of matter which has definite size and definite shape.
17. The kind of energy that is active.
18. A group of atoms that make up a particle of a compound.
19. The kind of change that takes place when new compounds are formed.
20. The state of matter with definite size but without definite shape.
21. The group to which crabs and insects both belong.
22. The kind of energy which is stored.
23. Burning fast enough to give light.
24. The element common in charred things.
25. The group of animals to which snails belong.
26. The kind of change that usually takes place when things are mixed.
27. The group of animals to which crayfish belong but insects do not.
28. The body regulator besides water.
29. The substance that turns blue when iodine is added.

U5 ___ animal
D2 ___ arachnid
U1 21 anthropoid
R4 14 atom
D1 ___ calcium
U1 3 carbohydrate
L1 24 carbon
U1 15 carbon dioxide
D4 19 chemical
D4 23 combustion
L3 ___ compound
R5 ___ conservation
U2 27 crustacean
U3 5 element
D3 ___ energy
D2 ___ fats
D3 11 gas
R1 4 gravity
U6 ___ heat
U2 13 hydrogen
R1 12 inorganic
U2 ___ insect
L1 ___ insoluble
D3 17 kinetic
U1 ___ light
L2 20 liquid
R3 ___ matter
U2 ___ mineral
R2 18 molecule
U2 25 mollusk
U1 9 nitrogen
D3 1 organ
R2 10 organism
D2 7 oxidation
L2 2 oxygen
L4 26 physical
L3 22 potential
R3 6 proteins
R2 16 solid
R1 8 soluble
D4 29 starch
U2 ___ sugar
L3 28 vitamins This test was given to three biology classes, first without the use of the graph, and then the new self-testing feature was explained and used. Their scores on the two methods were thus found to be closely correlated.

The moves are taken in the order of the numbering of the statements, that is, the first statement is the basis for the first move. The person taking the test must choose the word which best fits the statement, and then move in accordance with the directions accompanying that particular word. He indicates his move with a penciled line. The second move is based on the second statement and starts where the first move ended. Thus the word fitting the first statement is "organ" and the directions with it require a move of three squares down. The second move is made correctly by following the directions opposite the correct answer "oxygen", which is two moves to the left. Other moves are made in order.

A person taking the test must choose the right move every time in order to succeed. If he is uncertain there is nothing to indicate the correct move. If he makes the wrong move at any time he will probably not know it until later when he runs into difficulty, and must go back and find and correct his error. Any of the following are difficulties which indicate that an error has been made: Running into or across the boundary of a compartment. Touching a previously made move in any way. Failure to hit the doorways and proceed from one compartment to another. When all goes well one proceeds smoothly until the end of the test.

I have called this a test, but it may also be used as a work unit. The pupil should usually be allowed to use his textbooks in either case, because this gives him source of information which his own unaided mind might be unable to supply. If the teacher desires to use my invention as a test, he need only arrange it so that the pupils cannot get help from one another and base the grade solely on the time it takes to complete the test. The theory is that the better the pupils know the subject matter, the less mistakes they will make, and the sooner they will complete the test.

I have adapted self-testing to a so-called matching test in the example just explained. It could be equally well adapted to the true and false type of questions, the multiple choice type, the labeling of drawings, or perhaps to any objective method of testing.

Some important advantages of the use of my device are:—(1) The pupil is forced to correct his own mistakes in order to proceed, which psychologically, is one of the best methods of learning. (2) The papers can be corrected or graded almost instantly by the teacher. A glance shows the teacher if the work is correct, by comparison with a key. This almost completely relieves the teacher of one of his greatest bugbears—grading papers. (3) It is easy to make different routes for the same set of questions, thus minimizing copying. (4) The same printed copy may be used several times making for greater economy. (5) Pupils can work at different speeds according to their ability, through a course without a great deal of trouble to the teacher. (6) It encourages exactness and good study habits on the part of the pupils. (7) It is particularly useful for extension courses and correspondence schools.

Although I have shown and described herein a preferred embodiment of my invention, it is to be definitely understood that I do not desire to limit the application of my invention thereto, and any change or changes may be made in materials and structure, shape, and arrangement of parts, within the spirit of the invention and the scope of the subjoined claims.

What is claimed is:—

1. A knowledge testing device of the character described comprising a plate having its upper surface constructed with intersecting lines defining points, transverse and longitudinal intersecting linear members on said upper surface arranged parallel to but displaced laterally with respect to some of said lines and dividing said upper surface into a plurality of compartments, said transverse linear member being formed with openings one at each side of said longitudinal member and constituting gates establishing communication between adjacent compartments on the same sides of said longitudinal member, said longitudinal member being formed with an opening at one side only of said transverse linear member and constituting a gate establishing communication between two of said compartments on the same side of said transverse member, said gates being arranged with respect to certain of said points whereby a continuous line leading from a point in one of said compartments constituting a starting point may be drawn continuously through others of said points in a manner to pass through all of said gates and into said compartments without crossing any portion of said transverse and longitudinal linear members, the starting point and the others of the points through which said line passes being determined in position by reference to a table containing correct and incorrect written or printed answers each including a point designation orientated only with respect to the preceding point met by said line.

2. A device for demonstrating the correctness or incorrectness of answers to a written or printed list of questions arranged in conjunction with corresponding correct and incorrect answers having directional and distance designations for the drawing of a continuous line through points defined by the intersections of the lines of a graph, said device comprising two transverse and longitudinal strips constructed on said graph so as to be parallel to adjacent lines of the graph in a manner to define four different compartments, diagonally opposite ones of which lack immediate communication, adjacent ones of said compartments communicating only by means of a single opening in the corresponding strip, said openings having their edges sufficiently spaced on opposite sides of a correctly drawn portion of said continuous line to permit only said correctly drawn portion to pass therethrough.

PAUL WILLIAM NESBIT.